Figure 1:
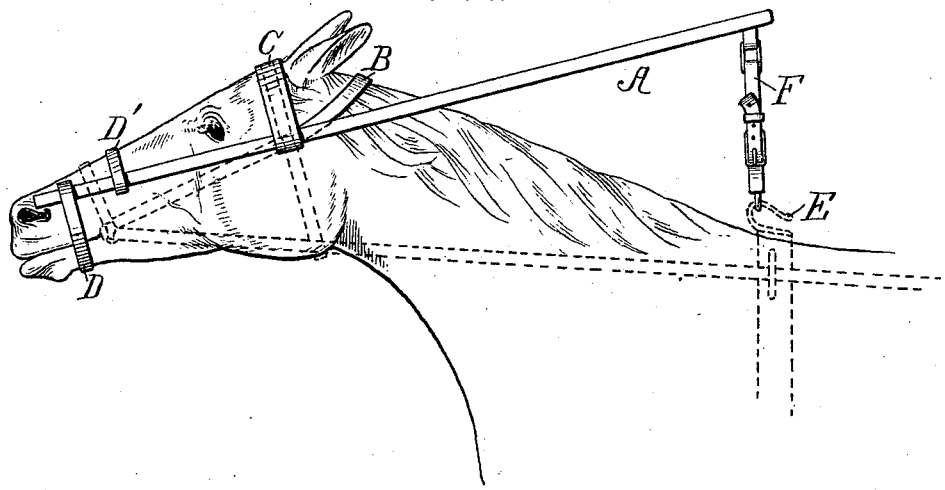

(No Model.)

P. T. CHALFANT.
HORSE CHECKING DEVICE.

No. 516,365. Patented Mar. 13, 1894.

WITNESSES:
A. V. Groupe
W. E. Watson

INVENTOR
Peter T. Chalfant
BY M. W. Collet
ATTORNEY.

THE NATIONAL LITHOGRAPHING COMPANY,
WASHINGTON, D. C.

UNITED STATES PATENT OFFICE.

PETER T. CHALFANT, OF PHILADELPHIA, PENNSYLVANIA.

HORSE-CHECKING DEVICE.

SPECIFICATION forming part of Letters Patent No. 516,365, dated March 13, 1894.

Application filed August 7, 1893. Serial No. 482,535. (No model.)

*To all whom it may concern:*

Be it known that I, PETER T. CHALFANT, a citizen of the United States, and a resident of the city and county of Philadelphia and State of Pennsylvania, have invented a new and useful Improvement in Checking Devices for Horses, of which the following is a clear and sufficient specification, reference being had to the drawings annexed.

My invention belongs to the class of checking devices that are used for racing trotting horses and acts to depress the top of the horse's head and to keep the head and the neck stretched out. Hitherto these three things have not been accomplished at the same time, and indeed would not be desired for any other than speeding purposes as the check rein in use for other purposes is intended to arch the horse's neck and keeps the head at an acute angle with the vertical. The keeping of the head down and the nose up acts in two ways; first the horse can not get into a suitable position to run, in doing which the top of the head is more elevated, and second the throat is kept well open so that the horse breathes free. The stretching out of the neck aids in giving the free wind and makes the horse unable to run and also prevents him from being choked by the drawing in of the reins. This last is the more important and has never before been accomplished either by itself or in conjunction with the two previously mentioned results.

Figure 2:
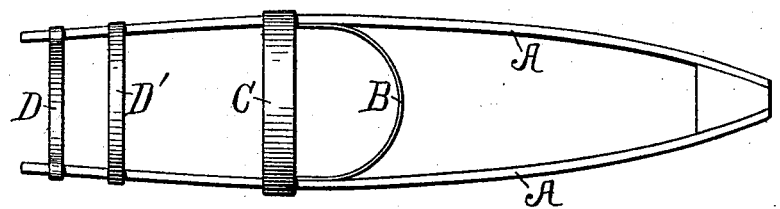
Figure 3:
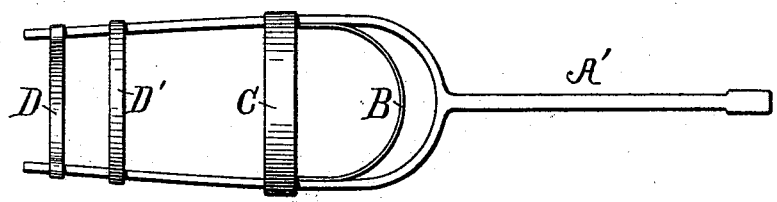
Figure 4:
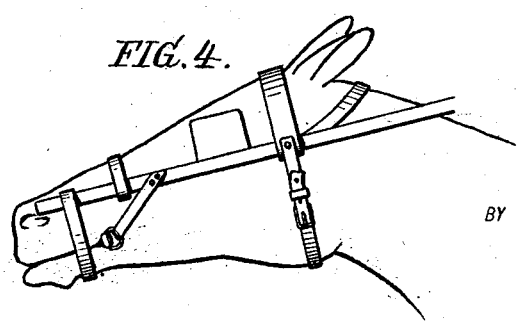

Figure 1 is a view of my invented device applied to a horse. Fig. 2 is a view in plan of the same. Fig. 3 is a modification and Fig. 4 is a view of a second modification in which parts of the checking device take the place of the bridle straps.

The two cheek pieces A, A, are run at the side of the horse's head. They are made, in practice, generally, and to secure the best result must be constructed, of springing wood or other elastic material. They are joined together at the upper ends preferably by a chock piece *a*, to which are nailed or bolted the cheek pieces A, A. These cheek pieces are sufficiently long to extend from the horse's nose approximately over the surcingle, when the head is in position shown in Fig. 1. The straps forming the main operating features of my device are the oppositely acting straps, the one marked B, passed over the forehead of the horse and operating to press down the top of the horse's head and a strap C, passed under the lower jaw of the horse and acting to keep the horse's nose up.

To hold the device in position I use in practice the additional straps D passing over the horse's nose and the strap E passing back of the horse's ears. From the upper end of the cheek pieces A, A, a connection F (in practice a strap provided with a buckle to admit of its lengthening and shortening) goes to the check hook G. The horse therefore can not draw his head backward without at the same time lifting his nose and thus keeping his throat open. This is a very important matter as it permits the horse to be held very firmly by the reins without any danger whatever of choking him.

A modification is shown in Fig. 3, where the cheek pieces, instead of extending separately over the back of the animal until near their ends, are joined together in one piece and this extended over the animal's back. To this piece F', the strap F is attached.

A modification is shown in Fig. 4 in which parts of the bridle are replaced by the cheek pieces.

Having now described my invention, what I claim, and desire to secure by Letters Patent, is—

The combination of the cheek pieces at the side of the animal's head, and substantially in line with the axis of said head, a rigid piece rigidly connected to and extending substantially in a straight line with the cheek pieces, and long enough, when the same is drawn toward the back of the animal, to cause the end of same to occupy a place substantially immediately above the surcingle hook, flexible connections between the cheek pieces extending beneath the lower portion of the horse's head, and another flexible connection extending over the top of the horse's head, means for holding the cheek pieces in place on the horse's head and a connection between the back end of the extension and the surcingle hook all substantially as described.

PETER T. CHALFANT.

Witnesses:
M. W. COLLET,
JACOB BREWER.